United States Patent
Binder et al.

(10) Patent No.: US 11,905,353 B2
(45) Date of Patent: Feb. 20, 2024

(54) PRESSURE SENSITIVE ADHESIVE COMPOSITIONS AND METHODS OF MAKING SAME

(71) Applicants: Rohm and Haas Company, Collegeville, PA (US); Dow Global Technologies LLC, Midland, MI (US)

(72) Inventors: Joseph B Binder, Haverford, PA (US); Saswati Pujari, Collegeville, PA (US); Hany Necola, Valbonne (FR)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 493 days.

(21) Appl. No.: 16/639,446

(22) PCT Filed: Jun. 28, 2018

(86) PCT No.: PCT/US2018/040034
§ 371 (c)(1),
(2) Date: Feb. 14, 2020

(87) PCT Pub. No.: WO2019/036121
PCT Pub. Date: Feb. 21, 2019

(65) Prior Publication Data
US 2021/0071042 A1    Mar. 11, 2021

Related U.S. Application Data

(60) Provisional application No. 62/546,073, filed on Aug. 16, 2017.

(51) Int. Cl.
| | | |
|---|---|---|
| *C08F 220/18* | (2006.01) | |
| *C09J 7/38* | (2018.01) | |
| *C08F 218/08* | (2006.01) | |
| *C08F 2/22* | (2006.01) | |

(52) U.S. Cl.
CPC .......... *C08F 220/1808* (2020.02); *C08F 2/22* (2013.01); *C08F 218/08* (2013.01); *C09J 7/385* (2018.01); *C09J 2203/334* (2013.01); *C09J 2433/00* (2013.01)

(58) Field of Classification Search
CPC .... C08F 220/1808; C08F 2/22; C08F 218/08; C09J 7/385; C09J 2203/334; C09J 2433/00; C09J 133/04
See application file for complete search history.

(56) References Cited

U.S. PATENT DOCUMENTS

| | | | |
|---|---|---|---|
| 4,371,659 A | 2/1983 | Druschke et al. | |
| 5,990,229 A * | 11/1999 | Hille | A61L 15/58 528/495 |
| 6,225,401 B1 | 5/2001 | Rehmer et al. | |
| 6,420,023 B1 | 7/2002 | Rowley et al. | |
| 7,527,842 B2 * | 5/2009 | Mathy | B32B 27/34 428/35.8 |
| 8,734,944 B2 | 5/2014 | Ahn et al. | |
| 2010/0092774 A1 | 4/2010 | Schoecker et al. | |
| 2014/0290856 A1 | 10/2014 | Hammond et al. | |
| 2016/0280967 A1* | 9/2016 | Ukei | C09J 7/22 |

FOREIGN PATENT DOCUMENTS

| | | |
|---|---|---|
| EP | 2651642 B1 | 10/2015 |
| JP | 2004341273 A | 12/2004 |
| WO | 9818829 | 5/1998 |
| WO | 2008/146503 A1 | 12/2008 |
| WO | 2011/009800 A1 | 1/2011 |
| WO | 2012030088 A3 | 5/2012 |
| WO | 2014/004287 A1 | 1/2014 |
| WO | 2014/053708 A2 | 4/2014 |
| WO | 2016027993 | 2/2016 |

OTHER PUBLICATIONS

Machine translation of WO 2008/146503 A1 (Year: 2008).*
PCT/US2018/040034, International Preliminary Report on Patentability dated Feb. 18, 2020.
PCT/US2018/040034, International Search Report and Written Opinion dated Sep. 21, 2018.

* cited by examiner

*Primary Examiner* — Scott R. Walshon
(74) *Attorney, Agent, or Firm* — Boyle Fredrickson S.C.

(57) ABSTRACT

Pressure sensitive adhesive compositions are disclosed comprising acrylic emulsions that are emulsion polymerization products of (a) a monomer mixture comprising, based on the total weight of monomers in the monomer mixture, from 50 to 99 weight percent 2-ethylhexyl acrylate and from 1 to 50 weight percent an unsaturated monomer, (b) a surfactant, and (c) an initiator. Methods for preparing pressure sensitive adhesive compositions are also disclosed. Food contact articles comprising the disclosed pressure sensitive adhesive compositions are also disclosed. In some embodiments, the disclosed food contact articles have an overall migration of less than 25 mg/dm$^2$, as measured in accordance with EN 1186, or less than 10 mg/dm$^2$, as measured in accordance with EN 1186.

14 Claims, No Drawings

PRESSURE SENSITIVE ADHESIVE COMPOSITIONS AND METHODS OF MAKING SAME

REFERENCE TO RELATED APPLICATIONS

The present application claims the benefit of U.S. Provisional Application No. 62/546,073, filed on Aug. 16, 2017.

FIELD OF THE DISCLOSURE

The instant disclosure relates to pressure sensitive adhesive compositions. More particularly, the disclosure relates to pressure sensitive adhesive compositions for use in, for example, food contact applications, the compositions having improved overall migration properties. The disclosure further relates to methods of making pressure sensitive adhesive compositions for use in, for example, food contact articles, the compositions having improved overall migration properties.

BACKGROUND AND SUMMARY OF THE DISCLOSURE

Adhesive compositions are useful for a wide variety of purposes. One particularly useful subset of adhesive compositions is pressure sensitive adhesives. The use of pressure sensitive adhesives in different end-use applications is generally known. For instance, pressure sensitive adhesives can be used with labels, tapes, notepads, decals, bandages, decorative and protective sheets, and a wide variety of other products. As used in the art, the term "pressure sensitive adhesive" designates a material comprising one or more polymer compositions which, when dried, is aggressively and permanently tacky at room temperature. A typical pressure sensitive adhesive will firmly adhere to a variety of dissimilar surfaces upon mere contact without the need of more than finger or hand-applied pressure.

Pressure sensitive adhesives are often used in materials which come into contact with food (e.g., packaging), in which case the pressure sensitive adhesive is considered a food contact material. Food contact materials are regulated to avoid endangering health or damaging the associated food product. The regulations include migration limits which aim to control user exposure to certain substances. As used herein, "migration" refers to the transfer of chemical substances from food contact materials into an associated food product. The overall migration limit, established in Commission Regulation (EU) No. 10/2011, is one of the foundations of European regulation to ensure that plastic materials, and articles incorporating plastic materials, intended for contact with food products are suitable for the intended application. The purpose of the test is to ensure that the plastic is inert and does not give rise to ruining of the food product. The overall migration limit provides for a gravimetric determination with no requirement to identify the particular chemical substances migrating. The rationale is that, above a certain level, even the migration of risk-free substances should not be tolerated as they may affect the quality of the food product. The overall migration limit provides guidance on an upper limit for the total quantity of all substances permitted to migrate into the food product. Per Commission Regulation (EU) No. 10/2011, the overall migration limit for plastic food contact materials is 10 mg of substances per 1 $dm^2$ of surface area of the plastic material.

Therefore, pressure sensitive adhesive compositions, and food contact articles comprising same, exhibiting improved overall migration properties in food contact applications (e.g., in pressure sensitive adhesives in food contact articles), are desirable.

Food contact articles including an adhesive layer comprising a pressure sensitive adhesive composition are disclosed. The disclosed food contact articles exhibit an overall migration of less than 25 $mg/dm^2$, or less than 10 $mg/dm^2$. In some embodiments, the disclosed food contact articles are plastic packaging, labels, or tapes.

In some embodiments, the disclosed pressure sensitive adhesive compositions comprise an acrylic copolymer dispersed in an aqueous medium, i.e., an acrylic emulsion. The disclosed acrylic emulsions are emulsion polymerization products of (a) a monomer mixture comprising, based on the total weight of monomers in the monomer mixture, from 50 to 99 weight percent 2-ethylhexyl acrylate ("EHA") and from 1 to 50 weight percent an unsaturated monomer, (b) a surfactant, and (c) an initiator. In some embodiments, the disclosed pressure sensitive adhesive compositions have an overall migration of less than 25 $mg/dm^2$, as measured in accordance with EN 1186, or less than 10 $mg/dm^2$, as measured in accordance with EN 1186.

Methods for preparing pressure sensitive adhesive compositions are also disclosed. In some embodiments, the methods comprise preparing a monomer emulsion by dispersing (a) a monomer mixture and (b) a surfactant in an aqueous medium, the monomer mixture comprising from 50 to 99 weight percent, based on the total weight of monomers in the monomer mixture, 2-ethylhexyl acrylate, and from 1 to 50 weight percent, based on the total weight of monomers in the monomer mixture, an unsaturated monomer. The methods further comprise introducing (c) an initiator to the monomer emulsion, thereby polymerizing the monomer mixture to form an acrylic emulsion suitable for use in a pressure sensitive adhesive composition.

Food contact articles comprising the disclosed pressure sensitive adhesive compositions are also disclosed. In some embodiments, the disclosed food contact articles have an overall migration of less than 25 $mg/dm^2$, as measured in accordance with EN 1186, or less than 10 $mg/dm^2$, as measured in accordance with EN 1186.

DETAILED DESCRIPTION OF THE DISCLOSURE

The instant disclosure relates to food contact articles including an adhesive layer comprising a pressure sensitive adhesive composition. The disclosed food contact articles exhibit an overall migration of less than 25 $mg/dm^2$, or less than 10 $mg/dm^2$. In some embodiments, the disclosed food contact articles are plastic packaging, labels, or tapes.

In some embodiments, the disclosed pressure sensitive adhesive compositions comprise an acrylic emulsion of an acrylic copolymer dispersed in an aqueous medium. In some embodiments, the acrylic emulsion is formed via radical polymerization, e.g., emulsion polymerization. For instance, to form the acrylic emulsion, a monomer mixture can be dispersed throughout an aqueous medium together with a surfactant, thereby forming an aqueous monomer emulsion. The surfactant acts as a emulsifier and enables droplets of the monomer mixture, which is hydrophobic, to form throughout the aqueous medium. An initiator is then introduced into the aqueous monomer emulsion. The initiator reacts with the monomer mixture dispersed throughout the aqueous medium until all or substantially all of the monomer mixture is polymerized. The end result is an acrylic emulsion comprising a dispersion of acrylic copolymer particles in the aqueous medium, the polymer particles comprising constituent units each being derived from a particular monomer in the monomer mixture. As used herein, "copolymer" refers to a polymer in which two or more different types of monomers are joined in the same polymer chain.

In some embodiments, the monomer mixture comprises 2-ethylhexyl acrylate and another unsaturated monomer (the "unsaturated monomer"). In some embodiments, 2-ethylhexyl acrylate accounts for at least half of to the total weight of the monomer mixture, i.e., the monomer mixture comprises greater than or equal to 50 weight percent, based on the total weight of the monomers in the monomer mixture, 2-ethylhexyl acrylate. In some embodiments, the monomer mixture comprises from 50 to 99 weight percent, based on the total weight of the monomers in the monomer mixture, 2-ethylhexyl acrylate, or from 60 to 90 weight percent, based on the total weight of the monomers in the monomer mixture, 2-ethylhexyl acrylate, or from 70 to 85 weight percent, based on the total weight of the monomers in the monomer mixture, 2-ethylhexyl acrylate, or from 80 to 83 weight percent, based on the total weight of the monomers in the monomer mixture, 2-ethylhexyl acrylate.

In some embodiments, the monomer mixture comprises from 1 to 50 weight percent, based on the total weight of the monomers in the monomer mixture, an unsaturated monomer, or from 10 to 40 weight percent, based on the total weight of the monomers in the monomer mixture, an unsaturated monomer, or from 10 to 30 weight percent, based on the total weight of the monomers in the monomer mixture, an unsaturated monomer. The unsaturated monomer is present in the monomer mixture in addition to 2-ethylhexyl acrylate (which is present in an amount as described above).

In some embodiments, the unsaturated monomer is an olefinically unsaturated monomer. Suitable olefinically unsaturated monomers include esters of monoethylenically unsaturated carboxylic acids having 3 to 24 carbon atoms, in particular esters of acrylic and methacrylic acid, including methyl acrylate ("MA"), ethyl acrylate ("EA"), butyl acrylate ("BA"), butyl methacrylate, isobutyl acrylate, isobutyl methacrylate, isoamyl acrylate, isoamyl methacrylate, 2-ethylhexyl methacrylate, isooctyl acrylate, isooctyl methacrylate, n-propyl acrylate, isopropyl acrylate, methyl methacrylate ("MMA"), decyl acrylate, decyl methacrylate, dodecyl acrylate, and dodecyl methacrylate. α,β-Monoethylenically unsaturated mono- or dicarboxylic acids of 3 to 6 carbon atoms, such as acrylic acid ("AA"), methacrylic acid, itaconic acid, fumaric acid and maleic acid, and the anhydrides of mono-olefinically unsaturated dicarboxylic acids, such as maleic anhydride and itaconic anhydride, are also suitable. Other useful olefinically unsaturated monomers are amides, such as acrylamide, methacrylamide, tetrahydrofurfurylacrylamide, tetrahydrofurfurylmethacrylamide, diacetoneacrylamide, hydroxyalkyl acrylates and methacrylates, such as 2-hydroxyethyl acrylate, 2-hydroxyethyl methacrylate, 4-hydroxybutyl acrylate and 4-hydroxybutyl methacrylate, and monomers such as 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine and 2-methylene-1,3-thiolene. Still other useful olefinically unsaturated monomer include ethylene, propylene, isobutylene, butadiene, isoprene, vinyl methyl ether, vinyl isobutyl ether, vinylpyridine, β-aminoethyl vinyl ether, aminopentyl vinyl ether, tert-butylaminoethyl methacrylate, vinylaromatics, such as styrene or methylstyrenes, and vinyl acetate ("VA"). In embodiments including vinyl acetate as unsaturated monomer, the amount of vinyl acetate, based on the total weight of monomers in the monomer mixture, is less than 4 weight percent.

The resulting acrylic copolymer comprises constituent units derived from 2-ethylhexyl acrylate and from the unsaturated monomer, according to the compositions described above, in various embodiments. The acrylic copolymer is dispersed throughout the aqueous medium, thereby forming the acrylic emulsion.

Further, solubility parameters of monomers suitable for use in the disclosed acrylic polymers may be used to predict the migration performance of the resulting adhesive compositions. Solubility parameters are measures of the interaction forces between solutes and solvents which can be used to predict the extent to which a given solute will dissolve in a given solvent (Hansen, C. M.; *The Three Dimensional Solubility Parameter and Solvent Diffusion Concept: Their Importance in Surface Coating Formulation:* 1967, Danish Technical Press, Copenhagen. Hansen, C. M.; *Hansen Solubility Parameters: A User's Handbook,* $2^{nd}$ Ed.: 2007, CRC Press, Boca Raton). In the Hansen solubility parameter ("HSP") system, the interactions are decomposed into three components: $\delta_D$, the dispersion force; $\delta_P$, the polar or dipole-dipole force; and $\delta_H$, the hydrogen-bonding force. These parameters are generally determined empirically either by direct experiments or by group contribution methods based on experimental data. The smaller the differences are between the parameters for two different materials, the stronger the affinity of one for the other will be.

Hansen solubility parameters for adhesive polymers may be used to predict the overall migration performance of the polymer in a solvent such as 95% ethanol volume/volume. Polymers with HSP closer to those of 95% ethanol are expected to have higher migration in 95% ethanol. The HSP Distance between 95% ethanol and the polymer is calculated as follows:

$$Ra = \sqrt{4(\delta_{D1}-\delta_{D2})^2+(\delta_{P1}-\delta_{P2})^2+(\delta_{H1}-\delta_{H1})^2},$$

where Ra is the HSP Distance, $\delta_{D1}$, $\delta_{P1}$, and $\delta_{H1}$ are the HSP for 95% ethanol and $\delta_{D2}$, $\delta_{P2}$, and $\delta_{H2}$ are the HSP for the polymer in question. The HSPs for 95% ethanol volume/volume are $\delta_D$=15.94, $\delta_P$=9.31, and $\delta_H$=19.25 $(J/cm^3)^{1/2}$, calculated from a linear combination of the HSPs for ethanol and water weighted by volume fraction. The polymer HSP is calculated by linear combination of the HSP for each component monomer weighted by weight fraction, using HSP data contained in Hansen, C. M.; *Hansen Solubility Parameters: A User's Handbook,* $2^{nd}$ Ed.: 2007, CRC Press, Boca Raton. The polymer HSP for a polymer prepared from 82.4% EHA, 16.6% MMA, and 1% AA are $\delta_D$=15.0, $\delta_P$=5.0, and $\delta_H$=3.8 $(J/cm^3)^{1/2}$, derived from the following monomer HSPs:

TABLE 1

Example Monomer HSPs in $(J/cm^3)^{1/2}$

| Monomer | $\delta_D$ | $\delta_P$ | $\delta_H$ |
|---------|------------|------------|------------|
| EHA     | 14.8       | 4.7        | 3.4        |
| MMA     | 15.8       | 6.5        | 5.4        |
| VA      | 16         | 7.2        | 5.9        |
| Sty     | 18.6       | 1          | 4.1        |
| EA      | 15.5       | 7.1        | 5.5        |
| BA      | 15.6       | 6.2        | 4.9        |
| AA      | 17.7       | 6.4        | 14.9       |
| MA      | 15.3       | 6.7        | 9.4        |
| HPA     | 16         | 13.2       | 13.4       |

In the case that the HSP for a monomer are not available, they may be estimated by group contribution methods from related monomers and group contribution terms. According to the group contribution method described in Hansen, C.

M.; *Hansen Solubility Parameters: A User's Handbook*, 2nd Ed.: 2007, CRC Press, Boca Raton, the HSP term may be estimated as a sum of the contributions from different groups in the monomer:

$$\delta = \sqrt{\frac{\sum U}{\sum V}}$$

where δ may be any of the three components of the HSP, U is the group contribution for each different part of the monomer for the selected component of the HSP, and V is the volume contribution for each different part of the monomer. For example, the HSP for sodium vinyl sulfonate ("SVS") may be estimated from those for methyl vinyl sulfone and group contribution terms from the literature. Methyl vinyl sulfone has the structure $H_2C=CH-S(=O)_2Me$ and SVS has the structure $H_2C=CH-S(=O)_2ONa$, so the HSP for SVS is estimated by taking the group contributions for methyl vinyl sulfone, subtracting those for the methyl group, adding those for a hydroxyl group, and making and adjustment for the conversion of the hydroxyl group to a sodium salt. The data for methyl vinyl sulfone, the methyl group, and the hydroxyl group are taken from Hansen, C. M.; *Hansen Solubility Parameters: A User's Handbook*, 2nd Ed.: 2007, CRC Press, Boca Raton, while the data for the sodium salt adjustment are taken from Barra, J.; Pella, M.-A.; Bustamante, P. *Eur. J. Pharm. Sci.* 2000, 10, 153-161.

TABLE 2

Estimation of HSP for SVS $(J/cm^3)^{1/2}$

| | V $(cm^3/mol)$ | $\delta_D$ $(J/cm^3)^{1/2}$ | $\delta_P$ $(J/cm^3)^{1/2}$ | $\delta_H$ $(J/cm^3)^{1/2}$ | $U_D$ (cal/mol) | $U_P$ (cal/mol) | $U_H$ (cal/mol) |
|---|---|---|---|---|---|---|---|
| Methyl vinyl sulfone | 87.6 | 16.8 | 19.6 | 4.8 | | | |
| Calculated from HSP and volume | | | | | 5909 | 8043 | 482 |
| Methyl group | 33.5 | | | | 1180 | 0 | 0 |
| Hydroxyl group | 10 | | | | 1770 | 700 | 4650 |
| Sodium salt adjustment | 9.2 | | | | 986 | 2033 | 2941 |
| SVS | 73.3 | 20.7 | 24.8 | 21.5 | | | |

As an example, $\delta_H$ for SVS is calculated as follows:

$$\delta_H = \sqrt{\left(\frac{482 - 0 + 4650 + 2941}{73.3}\right) \times 4.184 \text{ J/cal}} = 21.5 \ (J/cm^3)^{1/2}$$

It would be readily apparent to those of ordinary skill in the art how to use the above group contribution methods to calculate HSP for other monomers. Moreover, HSP may also be calculated from experimental data for the monomer in question using methods described in Hansen, C. M.; *Hansen Solubility Parameters: A User's Handbook*, 2nd Ed.: 2007, CRC Press, Boca Raton. The HSP Distance (Ra), once determined for a particular polymer/solvent disclosed herein, can be included in a Migration Parameter formula, discussed below, to provide a prediction for the overall migration performance of an adhesive composition.

In some embodiments, the acrylic copolymer can comprise, in addition to the aforementioned monomers, small amounts of polyethylenically unsaturated monomers, which when the polymer is prepared result in crosslinking. Examples of polyethylenically unsaturated monomers are diesters and triesters of ethylenically unsaturated carboxylic acids, more particularly the bis- and trisacrylates of diols or polyols having 3 or more OH groups, examples being the bisacrylates and the bismethacrylates of ethylene glycol, diethylene glycol, triethylene glycol, neopentyl glycol or polyethylene glycols, vinyl and allyl esters of saturated or unsaturated dicarboxylic acids, and the vinyl and allyl esters of monoethylenically unsaturated monocarboxylic acids. The fraction of such monomers, however, will generally not exceed, based upon the total weight of monomers in the monomer mixture, 1 weight percent, or 0.5 weight percent, or 0.1 weight percent.

In some embodiments, examples of suitable surfactants for use according this disclosure include, but are not limited to, cationic surfactants, anionic surfactants, zwitterionic surfactants, non-ionic surfactants, and combinations thereof, such that the surfactants do not contain alkylphenol ethoxylate moieties. The alkylphenol ethoxylate moiety has the chemical structure:

$$R^1R^2C_6H_3-O-(CH_2CH_2O)_x-R^3,$$

where $R^1$ is H or $C_n H_{(2n+1)}$ where n has an average value that ranges from about 8 to about 12; where $R^2$ is H or $C_n H_{(2n+1)}$ where n has an average value that ranges from about 8 to about 12; where $C_6H_3$ is a substituted benzene ring and x has an average value that ranges from about 1 to about 70; where $R^3$ is H or another substituent such as $SO_3^-$. Here, x denotes the average number of moles of ethylene oxide added to the alkylphenol. Examples of cationic surfactants include, but are not limited to, quaternary amines, lauryl-pyridinium chlorides, cetyldimethyl amine acetate, and alkyldimethylbenzylammonium chlorides in which the alkyl group has from 8 to 18 carbon atoms. Examples of anionic surfactants include, but are not limited to, sulfonates, carboxylates, and phosphates. Examples of non-ionic surfactants include, but are not limited to, block copolymers containing ethylene oxide and silicone surfactants, such as ethoxylated linear or branched aliphatic alcohols, ethoxylated fatty acid, sorbitan derivative, lanolin derivative, or alkoxylated polysiloxane.

Anionic, non-ionic, or cationic surfactants which contain alkylphenol ethoxylate moieties such as ethoxylates of nonylphenol or ethoxylates of octylphenol are not preferred because they are not included in the Union list of authorized monomers, other starting substances, macromolecules obtained from microbial fermentation, additives and polymer production aids, Annex 1 of EU Commission Regulation 10/2011 governing food contact materials. In addition, surfactants which do not contain alkylphenol ethoxylate moieties tend to be more biodegradable and more likely to comply with environmental regulations, so surfactants containing alkylphenol ethoxylate moieties are not preferred in the disclosed adhesive compositions. Examples of alkylphenol ethoxylate surfactants include, but are not limited to, the sodium salt of the sulfuric ester of isooctylphenol ethoxylated with 1 to 50 ethylene oxide units, the sodium salt of the sulfuric ester of nonylphenol ethoxylated with 1 to 50 ethylene oxide units, and octylphenol ethoxylated with 1 to 50 ethylene oxide units. In some embodiments, the amount of surfactant used is from 0.2 to 5 weight percent, based on the total weight of the monomers in the monomer mixture.

In some embodiments, the initiator can be either a thermal initiator or a redox system initiator. Example of thermal initiators include, but are not limited to, sodium persulfate and ammonium persulfate. Where the initiator is a redox system initiator, the reducing agent can be, for example, an ascorbic acid, a sulfoxylate, or an erythorbic acid, while the oxidating agent can be, for example, a peroxide or a persulfate. In some embodiments, the amount of initiator used is less than 0.7 weight percent, based on the total weight of the monomers in the monomer mixture.

In some embodiments, a chain transfer agent may optionally be used. Examples of chain transfer agents which may be used include long chain alkyl mercaptans such as t-dodecyl mercaptans, methyl 3-mercaptopropionate, alcohols such as isopropanol, isobutanol, lauryl alcohol or t-octyl alcohol, carbon tetrachloride, tetrachloroethylene and trichloro-bromoethane. The amount of chain transfer agent used is inversely proportional to the amount of initiator used. That is, where the amount of initiator is relatively low (e.g., less than 0.3 weight percent, based on the total weight of the monomer mixture), some chain transfer agent can be used. However, when relatively high levels of initiator are used (e.g., greater than 0.3 weight percent, based on the total weight of the monomer mixture), the chain transfer agent can be left out entirely.

In some embodiments, the pressure sensitive adhesive compositions may further include, optionally, one or more additives. Examples of the one or more additives include, but are not limited to, a thickener, a defoamer, a wetting agent, a mechanical stabilizer, a pigment, a filler, a freeze-thaw agent, a neutralizing agent, a plasticizer, a tackifier, an adhesion promoter, and combinations thereof.

The pressure sensitive adhesive compositions may comprise 0 to 5 percent by weight of a thickener, based on the total weight of the adhesive composition. Suitable thickeners include, but are not limited to, ACRYSOL™, UCAR™ and CELLOSIZE™ which are commercially available from The Dow Chemical Company, Midland, Michigan.

The pressure sensitive adhesive compositions may comprise 0 to 2 percent by weight of a neutralizing agent, based on the total weight of the adhesive composition. Neutralizing agents are typically used to control pH to provide stability to the formulated pressure sensitive adhesive composition. Suitable neutralizing agent include, but are not limited to, aqueous ammonia, aqueous amines, and other aqueous inorganic salts.

The pressure sensitive adhesive compositions may comprise less than 50 percent by weight of a tackifier, based on the total weight of the adhesive composition. Suitable tackifiers include, but are not limited to, rosin resins including rosin acid and/or rosin ester obtained by esterifying rosin acid with alcohols or an epoxy compound and/or its mixture, non-hydrogenated aliphatic $C_5$ resins, hydrogenated aliphatic $C_5$ resins, aromatic modified $C_5$ resins, terpene resins, hydrogenated $C_9$ resins, and combinations thereof.

The pressure sensitive adhesive compositions may comprise less than 5 percent by weight of an adhesion promoter, based on the total weight of the adhesive composition.

Examples of the Disclosure

The present disclosure will now be described in further detail by discussing Illustrative Examples ("IE") and Comparative Examples ("CE") (collectively "the Examples"). However, the scope of the present disclosure is not, of course, limited to the IEs.

Preparation of Food Contact Articles

The prepared aqueous acrylic emulsions are coated onto substrates (e.g., BOPP, PET, aluminum foil, etc.) and dried for 5 minutes in an oven. Each film is then covered with a silicone release liner.

Overall Migration Testing Methods

The release liner is removed from the film, and then the film is exposed to the appropriate food simulant for 24 hours at 40° C. by total immersion in a beaker with a volume to surface ratio of 100 mL/dm$^2$. After exposure the sample is removed from the food simulant. The simulant is slowly evaporated to dryness and the beaker with residue is conditioned at 105° C. until mass constant is reached. The weight of the residue is determined as weight difference (weight beaker with residue minus weight empty beaker). The migrations are calculated both in terms of weight of residue per area film and weight fraction of the adhesive film. The tests are carried out in triplicate. The food simulant in the Examples is 95% ethanol in water (volume/volume). Other food simulants can also be used to demonstrate the effectiveness of the disclosed compositions, e.g., olive oil, isooctane, etc.

Illustrative Example 1 ("IE1")

Using a flask equipped with a mechanical stirrer, a charge composed of 1.34 g tetrasodium pyrophosphate, 269 g of deionized water, and 0.68 g ascorbic acid is warmed to 86° C. Next, 28 g of 6.6% concentration sodium persulfate in water is poured into the flask. Over a span of four hours, an emulsion made up of 24.5 g of 10% strength aqueous sodium hydroxide solution, 30 g of a 33% concentration solution of a sulfuric ester sodium salt of lauryl alcohol ethoxylated by 30 moles of ethylene oxide in water, 10.6 g of 25.0% concentration sodium vinylsulfonate solution in water, 5 g of a 44% strength solution of DOWFAX™ 2A1 in water, 2.2 g of lauryl alcohol ethoxylated with 7 mol of ethylene oxide, 172 g of water, 27.6 g of styrene, 1,079.2 g of 2-ethylhexyl acrylate, 27.6 g of vinyl acetate, 189.6 g of methyl methacrylate, and 7.2 g of acrylic acid is gradually dispensed into the flask. At the outset, the rate of addition is 1.42 g/minute for the first six minutes. The rate of addition is then raised steadily to 7.1 g/minute over the span of forty minutes. From the outset of the emulsion feed, 148 g of a sodium peroxodisulfate solution at 5% strength in water is added at a constant rate over five hours, and the reaction medium is maintained from 85 to 87° C.

After the completion of the feeds and at roughly 70° C., a solution of 1.38 g sodium bisulphite, 0.9 g acetone and 22.2 g water, and, at the same time, 23.8 g of a 5.5% concentration solution of tert-butyl hydroperoxide is dispensed to the flask during the span of sixty minutes. The acrylic emulsion of IE1 is obtained.

Comparative Example 1 ("CE1")

The same procedure used to produce IE 1 is repeated, except that 106.8 g of methyl methacrylate and 110.4 g of vinyl acetate are used. The acrylic emulsion of CE1 is obtained.

TABLE 2

IE1 and CE1 Performance Results

| Example | OM (mg/dm$^2$) | OM (wt % of film) | HSP Distance from Solvent | Migration Parameter |
|---|---|---|---|---|
| IE1 | 17 | 7.0 | 16.09 | 30.5 |
| CE1 | 64 | 26.3 | 16.05 | 36.1 |

As illustrated in Table 2, IE1 has relatively smaller OM compared to CE1.

Illustrative Examples 2 to 13 ("IE2" to "IE13")

The same procedure used to produce IE1 is repeated, except that the monomer compositions and initiators are varied as shown in Table 3. The acrylic emulsions of IE2 to IE13 are obtained.

Illustrative Examples 14 to 19 ("IE14" to "IE19")

Examples 14-19 are prepared according to the following general procedure with the monomer compositions, initiator amount, methyl-3-mercaptopropionate amount, and allyl methacrylate amount varied as shown in Table 3. Using a flask equipped with a mechanical stirrer, a charge composed of 1.05 g sodium carbonate, 945 g of deionized water, and 0.85 g of an aqueous solution of sodium dodecylbenzenesulfonate at 22.5% strength is warmed to 88° C. Separately, an emulsion made up of 360 g of water, 2.5 g of sodium carbonate, 19.5 g of an aqueous solution of sodium dodecylbenzenesulfonate at 22.5% strength, 11.4 g of a 31% concentration solution of sulfosuccinic acid ethoxylated alcohol half ester disodium salt in water, 1810.6 g of monomers (e.g., EHA, MMA, acrylic acid, allyl methacrylate), and optionally methyl-3-mercaptopropionate is prepared. Into the flask 66.1 g of the emulsion are added. Next, 28.9 g of 9.25% concentration ammonium persulfate in water is poured into the flask. After 8 minutes, the remainder of the emulsion is added to the flask over a span of eighty minutes. At the outset, the rate of addition is 14.3 g/minute for the first ten minutes. The rate of addition is then raised abruptly to 28.5 g/minute. From the outset of the emulsion feed, 83.5 g of a ammonium peroxodisulfate solution at 5.7% strength in water is added over eighty minutes, initially at 0.56 g/min for ten minutes, with the remainder added at a constant rate over 70 minutes. The reaction medium is maintained from 85 to 87° C.

After the completion of the feeds and at roughly 75° C., a solution of 3.38 g sodium formaldehyde sulfoxylate and 31.5 g water, and, at the same time, 37.9 g of a 16.9% concentration solution of tert-butyl hydroperoxide is dispensed to the flask during the span of thirty minutes. The acrylic emulsions of IE14 to IE19 are obtained.

Comparative Examples 2 to 7 ("CE2" to "CE7")

The same procedure used to produce CE14 is repeated, except that the monomer compositions and initiators are varied as shown in Table 3. The acrylic emulsions of CE2 to CE7 are obtained.

Comparative Examples 8 and 9 ("CE8" and "CE9")

The same procedure used to produce CE 1 is repeated, except that the monomer compositions and initiators are varied as shown in Table 3. The acrylic emulsions of CE8 to CE9 are obtained.

Table 3 illustrates additional Examples prepared and tested according to the methods described above.

TABLE 3

Example Formulations

| Example | OM (mg/dm$^2$) | EHA (wt %) | MMA (wt %) | VA (wt %) | Sty (wt %) | BA (wt %) | AA (wt %) | SVS (wt %) | Sodium persulfate (wt %) | APS (wt %) | Methyl-3-mercapto-propionate (wt %) | Allyl meth-acrylate (wt %) | Initiator millimoles/ wt of monomer (g) |
|---|---|---|---|---|---|---|---|---|---|---|---|---|---|
| IE1 | 17 | 80.91 | 14.21 | 2.07 | 2.07 | 0 | 0.54 | 0.2 | 0.7 | 0 | 0 | 0 | 0.029 |
| IE2 | 11.4 | 81.50 | 15.40 | 0 | 2.50 | 0 | 0.60 | 0 | 0.7 | 0 | 0 | 0 | 0.029 |
| IE3 | 7.2 | 80.91 | 16.28 | 0 | 2.07 | 0 | 0.54 | 0.2 | 0.7 | 0 | 0 | 0 | 0.017 |
| IE4 | 15.5 | 80.91 | 12.15 | 4.14 | 2.07 | 0 | 0.54 | 0.2 | 0.7 | 0 | 0 | 0 | 0.029 |
| IE5 | 21.1 | 80.91 | 12.15 | 4.14 | 2.07 | 0 | 0.54 | 0.2 | 0.7 | 0 | 0 | 0 | 0.029 |
| IE6 | 16.6 | 81.50 | 15.40 | 0 | 2.50 | 0 | 0.60 | 0 | 0.7 | 0 | 0 | 0 | 0.029 |
| IE7 | 22.6 | 80.91 | 16.28 | 0 | 2.07 | 0 | 0.54 | 0.2 | 0.7 | 0 | 0 | 0 | 0.029 |
| IE8 | 19.3 | 80.91 | 16.28 | 0 | 2.07 | 0 | 0.54 | 0.2 | 0.7 | 0 | 0 | 0 | 0.029 |
| IE9 | 18.6 | 80.91 | 15.25 | 1.03 | 2.07 | 0 | 0.54 | 0.2 | 0.7 | 0 | 0 | 0 | 0.029 |
| IE10 | 12.6 | 81.50 | 15.40 | 0 | 2.50 | 0 | 0.60 | 0 | 0.3 | 0 | 0 | 0 | 0.029 |
| IE11 | 5.1 | 81.50 | 15.40 | 0 | 2.50 | 0 | 0.60 | 0 | 0.3 | 0 | 0 | 0 | 0.013 |
| IE12 | 13.3 | 81.50 | 15.40 | 0 | 2.50 | 0 | 0.60 | 0 | 0.7 | 0 | 0 | 0 | 0.029 |
| IE13 | 13.5 | 81.50 | 15.40 | 0 | 2.50 | 0 | 0.60 | 0 | 0.3 | 0 | 0 | 0 | 0.013 |
| IE14 | 9.4 | 82.40 | 16.60 | 0 | 0 | 0 | 1.00 | 0 | 0 | 0.4 | 0 | 0 | 0.018 |
| IE15 | 11.9 | 82.40 | 16.60 | 0 | 0 | 0 | 1.00 | 0 | 0 | 0.4 | 0 | 0 | 0.018 |
| IE16 | 8.6 | 82.40 | 16.60 | 0 | 0 | 0 | 1.00 | 0 | 0 | 0.4 | 0 | 0.5 | 0.018 |
| IE17 | 18.6 | 82.40 | 16.60 | 0 | 0 | 0 | 1.00 | 0 | 0 | 0.4 | 0.5 | 0.5 | 0.018 |
| IE18 | 20.5 | 82.40 | 16.60 | 0 | 0 | 0 | 1.00 | 0 | 0 | 0.4 | 0.3 | 0.5 | 0.018 |
| IE19 | 10.5 | 82.40 | 16.60 | 0 | 0 | 0 | 1.00 | 0 | 0 | 0.4 | 0 | 0 | 0.018 |
| CE2 | 66 | 82.40 | 16.60 | 0 | 0 | 0 | 1.00 | 0 | 0 | 0.8 | 0 | 0.5 | 0.035 |
| CE3 | 34.7 | 82.40 | 16.60 | 0 | 0 | 0 | 1.00 | 0 | 0 | 0.4 | 0.5 | 0 | 0.018 |
| CE4 | 25.5 | 82.40 | 16.60 | 0 | 0 | 0 | 1.00 | 0 | 0 | 0.8 | 0 | 0 | 0.035 |

TABLE 3-continued

Example Formulations

| | | | | | | | | | | | | | |
|---|---|---|---|---|---|---|---|---|---|---|---|---|---|
| CE5 | 124.2 | 82.40 | 16.60 | 0 | 0 | 0 | 1.00 | 0 | 0 | 0.8 | 0.5 | 0 | 0.035 |
| CE6 | 30.5 | 82.40 | 16.60 | 0 | 0 | 0 | 1.00 | 0 | 0 | 0.8 | 0.5 | 0.5 | 0.035 |
| CE7 | 106.2 | 82.40 | 16.60 | 0 | 0 | 0 | 1.00 | 0 | 0 | 0.8 | 0.5 | 0 | 0.035 |
| CE8 | 305 | 0 | 3.20 | 0 | 2.50 | 93.70 | 0.60 | 0 | 1.2 | 0 | 0 | 0 | 0.050 |
| CE9 | 65 | 81.50 | 15.40 | 0 | 2.50 | 0 | 0.60 | 0 | 1.2 | 0 | 0 | 0 | 0.050 |
| CE1 | 64 | 80.91 | 8.01 | 8.28 | 2.07 | 0 | 0.54 | 0.2 | 1.2 | 0 | 0 | 0 | 0.029 |

| Example | HSP Distance from Solvent | Migration Parameter |
|---|---|---|
| IE1 | 16.09 | 30.5 |
| IE2 | 16.17 | 17.6 |
| IE3 | 16.10 | −0.6 |
| IE4 | 16.07 | 32.4 |
| IE5 | 16.07 | 32.4 |
| IE6 | 16.17 | 20.6 |
| IE7 | 16.10 | 28.6 |
| IE8 | 16.10 | 28.6 |
| IE9 | 16.10 | 29.5 |
| IE10 | 16.17 | 17.6 |
| IE11 | 16.17 | −11.8 |
| IE12 | 16.17 | 17.6 |
| IE13 | 16.17 | −11.8 |
| IE14 | 16.10 | 7.6 |
| IE15 | 16.10 | 7.6 |
| IE16 | 16.10 | 25.3 |
| IE17 | 16.10 | 8.7 |
| IE18 | 16.10 | 17.0 |
| IE19 | 16.10 | 7.6 |
| CE2 | 16.10 | 55.9 |
| CE3 | 16.10 | 64.7 |
| CE4 | 16.10 | 38.2 |
| CE5 | 16.10 | 95.4 |
| CE6 | 16.10 | 39.4 |
| CE7 | 16.10 | 95.4 |
| CE8 | 14.65 | 299.4 |
| CE9 | 16.17 | 54.3 |
| CE1 | 16.05 | 36.1 |

As illustrated in Table 3, the Examples with relatively higher OM incorporate chain transfer agent (e.g., MMP) and/or have high initiator levels (e.g., greater than 0.7 wt %). Further, Examples with BA as the major monomer and/or levels of VA 4 wt % or greater also have high migration. The Examples with relatively lower migration have initiator levels of 0.7 wt % or less, incorporate crosslinker, and/or have less than 4 wt % VA. The migration Parameter may be calculated for polymers containing 50% or more, by weight, EHA, allyl methacrylate crosslinker or no crosslinker, methyl-3-mercaptopropionate chain transfer agent or no chain transfer agent, persulfate initiators, and for which the residual monomer content has been reduced by means of a free radical redox initiator system. The migration parameter is calculated according to the following equation:

$$MP = 2030.8 - 128.4 \times A + 2314.2 \times B - 80.34 \times C - 253.5 \times (C - 0.107) \times (D - 0.092)$$

where MP is the Migration Parameter, A is the HSP Distance between the polymer and 95% ethanol, B is the millimoles of persulfate initiator per gram of total monomer, C is the grams of methyl-3-mercaptopropionate per 100 grams of total monomer, and D is the grams of allyl methacrylate per 100 g of total monomer. When the Migration parameter is less than 35, then the overall migration is less than 25 mg/dm$^2$.

In addition to the embodiments described above and those set forth in the Examples, many embodiment of specific combinations are within the scope of the disclosure, some of which are described below:

Embodiment 1. A pressure sensitive adhesive composition for use in an adhesive layer of a food contact article, comprising:
an acrylic emulsion formed from:
(a) a monomer mixture comprising, based on the total weight of monomers in the monomer mixture,
from 50 to 99 weight percent 2-ethylhexyl acrylate; and
from 1 to 50 weight percent an unsaturated monomer;
(b) a surfactant; and
(c) an initiator,
wherein the pressure sensitive adhesive composition has an overall migration of less than 10 mg/dm$^2$, as measured in accordance with EN 1186.

Embodiment 2. The pressure sensitive adhesive composition of any preceding or succeeding Embodiment, wherein the monomer mixture comprises, based on the total weight of monomers in the monomer mixture, from 60 to 90 weight percent 2-ethylhexyl acrylate.

Embodiment 3. The pressure sensitive adhesive composition of any preceding or succeeding Embodiment, wherein the monomer mixture comprises, based on the total weight of monomers in the monomer mixture, from 70 to 85 weight percent 2-ethylhexyl acrylate.

Embodiment 4. The pressure sensitive adhesive composition of any preceding or succeeding Embodiment, wherein the monomer mixture comprises, based on the total weight of monomers in the monomer mixture, from 80 to 83 weight percent 2-ethylhexyl acrylate.

Embodiment 5. The pressure sensitive adhesive composition of any preceding or succeeding Embodiment, wherein the unsaturated monomer does not contain 2-ethylhexyl acrylate.

Embodiment 6. The pressure sensitive adhesive composition of any preceding or succeeding Embodiment, wherein the unsaturated monomer is selected from the group consisting of methyl methacrylate, vinyl acetate, styrene, acrylic acid, and combinations thereof.

Embodiment 7. The pressure sensitive adhesive composition of any preceding or succeeding Embodiment, wherein the unsaturated monomer is selected from the group consisting of methyl acrylate, ethyl acrylate, butyl acrylate, butyl methacrylate, isobutyl acrylate, isobutyl methacrylate, isoamyl acrylate, isoamyl methacrylate, 2-ethylhexyl methacrylate, isooctyl acrylate, isooctyl methacrylate, n-propyl acrylate, isopropyl acrylate, methyl methacrylate, decyl acrylate, decyl methacrylate, dodecyl acrylate, dodecyl methacrylate, acrylic acid, methacrylic acid, itaconic acid, fumaric acid, maleic acid, maleic anhydride, itaconic anhydride, acrylamide, methacrylamide, tetrahydrofurfurylacrylamide, tetrahydrofurfurylmethacrylamide, diacetoneacrylamide, 2-hydroxyethyl acrylate, 2-hydroxyethyl methacrylate, 4-hydroxybutyl acrylate, 4-hydroxybutyl methacrylate, 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine, 2-methylene-1,3-thiolene, ethylene, propylene, isobutylene, butadiene, isoprene, vinyl methyl ether, vinyl isobutyl ether, vinylpyridine, β-aminoethyl vinyl ether, aminopentyl vinyl ether, tert-butylaminoethyl methacrylate, styrene, methylstyrene, vinyl acetate, and combinations thereof.

Embodiment 8. The pressure sensitive adhesive composition of any preceding or succeeding Embodiment, wherein the initiator is from 0.05 to 0.7 weight percent of the pressure sensitive adhesive composition, based on the total dry weight of the pressure sensitive adhesive composition.

Embodiment 9. The pressure sensitive adhesive composition of any preceding or succeeding Embodiment, wherein the initiator is selected from the group consisting of sodium persulfate, ammonium persulfate, and combinations thereof.

Embodiment 10. The pressure sensitive adhesive composition of any preceding or succeeding Embodiment, wherein the unsaturated monomer comprises vinyl acetate.

Embodiment 11. The pressure sensitive adhesive composition of any preceding or succeeding Embodiment, wherein the vinyl acetate accounts for less than or equal to 7 weight percent of the acrylic copolymer, based on the total weight of the monomer subunits.

Embodiment 12. The pressure sensitive adhesive composition of any preceding or succeeding Embodiment, further comprising a crosslinker.

Embodiment 13. The pressure sensitive adhesive composition of any preceding or succeeding Embodiment, wherein the crosslinker is allyl methacrylate.

Embodiment 14. The pressure sensitive adhesive composition of any preceding or succeeding Embodiment, wherein the crosslinker is allyl methacrylate.

Embodiment 15. A food contact article including an adhesive layer comprising the pressure sensitive adhesive composition any preceding or succeeding Embodiment, the food contact article having an overall migration of less than 25 mg/dm$^2$, as measured in accordance with EN 1186.

Embodiment 16. A food contact article including an adhesive layer comprising the pressure sensitive adhesive composition any preceding or succeeding Embodiment, the food contact article having an overall migration of less than 10 mg/dm$^2$, as measured in accordance with EN 1186.

Embodiment 17. The food contact article of any preceding or succeeding Embodiment, wherein the food contact article is a plastic packaging, label or tape.

Embodiment 18. A method for preparing a pressure sensitive adhesive composition for use in an adhesive layer of a food contact article, comprising:

preparing a monomer emulsion by dispersing (a) a monomer mixture and (b) a surfactant in an aqueous medium, the monomer mixture comprising from 50 to 99 weight percent, based on the total weight of monomers in the monomer mixture, 2-ethylhexyl acrylate, and from 1 to 50 weight percent, based on the total weight of monomers in the monomer mixture, an unsaturated monomer; and introducing (c) an initiator to the monomer emulsion, thereby polymerizing the monomer mixture to form an acrylic emulsion suitable for use in a pressure sensitive adhesive composition, wherein the pressure sensitive adhesive composition has an overall migration of less than 10 mg/dm$^2$, as measured in accordance with EN 1186.

Embodiment 19. A food contact article comprising the pressure sensitive adhesive composition prepared according to Embodiment 18, wherein the food contact article has an overall migration of less than 25 mg/dm$^2$.

Embodiment 20. A food contact article comprising the pressure sensitive adhesive composition prepared according to Embodiment 18 or Embodiment 19, wherein the food contact article has an overall migration of less than 10 mg/dm$^2$.

Embodiment 21. A food contact article including an adhesive layer comprising a pressure sensitive adhesive composition, the pressure sensitive adhesive composition comprising an acrylic copolymer having a Migration Parameter not greater than 35.

Embodiment 22. A food contact article including an adhesive layer comprising a pressure sensitive adhesive composition, the pressure sensitive adhesive composition comprising an acrylic copolymer consisting essentially of:

at least 50 weight percent, based on the total weight of the acrylic copolymer, 2-ethylhexyl acrylate;

optionally, an allyl methacrylate;

optionally, a methyl-3-mercaptopropionate;

a persulfate initiator, wherein a residual monomer content in the adhesive composition has been decreased by free a radical redox initiator system, and wherein the acrylic copolymer has a Migration Parameter ("MP") not greater than 35, the Migration Parameter being calculated according to the following equation:

$$MP = 2585.5 - 161.79 \times A + 1749.5 \times B - 81.91 \times C - 294.7 \times (C - 0.12) \times (D - 0.11),$$

where A is a Hansen Solubility Parameter distance between the polymer and a 95% ethanol solution (v/v), B is the millimoles of persulfate initiator per gram of total monomer, C is the grams of methyl-3-mercaptopropionate per 100 grams of total monomer, and D is the grams of allyl methacrylate per 100 g of total monomer.

Embodiment 23. The pressure sensitive adhesive composition according to any preceding or succeeding Embodiment, wherein the adhesive composition does not include an alkylphenol ethoxylate.

Embodiment 24. The pressure sensitive adhesive composition according to any preceding or succeeding Embodiment, wherein the surfactant (B) does not include an alkylphenol ethoxylate.

The invention claimed is:

1. A pressure sensitive adhesive composition for use in an adhesive layer of a food contact article, comprising:
an acrylic emulsion formed from:
(a) a monomer mixture consisting of, based on the total weight of monomers in the monomer mixture,
from 60 to 90 weight percent 2-ethylhexyl acrylate; and
from 40 to 10 weight percent of a plurality of unsaturated monomers consisting of (i) methyl methacrylate and (ii) styrene, vinyl acetate, and acrylic acid;
(b) a surfactant; and
(c) an initiator,
wherein the pressure sensitive adhesive composition has an overall migration of less than 10 mg/dm$^2$, as measured in accordance with EN 1186.

2. The pressure sensitive adhesive composition of claim 1, wherein the vinyl acetate accounts for less than or equal to 7 weight percent of the acrylic copolymer, based on the total weight of the monomer subunits.

3. The pressure sensitive adhesive composition of claim 1, further comprising a crosslinker.

4. The pressure sensitive adhesive composition of claim 1, wherein the adhesive composition does not include an alkylphenol ethoxylate.

5. The pressure sensitive adhesive composition of claim 1, wherein the surfactant (b) does not include an alkylphenol ethoxylate.

6. The pressure sensitive adhesive composition of claim 1 wherein the initiator is selected from the group consisting of sodium persulfate, ammonium persulfate, and combinations thereof.

7. The pressure sensitive adhesive composition of claim 6 comprising from 0.05 wt % to 0.7 wt % of the initiator.

8. The pressure sensitive adhesive composition of claim 1 wherein the pressure sensitive adhesive composition comprises 0 wt % butyl acrylate.

9. The pressure sensitive adhesive composition of claim 1, wherein monomer mixture (a) consists of from 70 to 90 weight percent 2-ethylhexyl acrylate and from 30 to 10 weight percent of the plurality of unsaturated monomers.

10. A food contact article including an adhesive layer comprising the pressure sensitive adhesive composition of claim 1, the food contact article having an overall migration of less than 25 mg/dm$^2$, as measured in accordance with EN 1186.

11. A pressure sensitive adhesive composition for use in an adhesive layer of a food contact article, comprising:
an acrylic emulsion formed from:
(a) a monomer mixture consisting of, based on the total weight of monomers in the monomer mixture,
from 60 to 90 weight percent 2-ethylhexyl acrylate; and
from 40 to 10 weight percent of unsaturated monomers consisting of (i) methyl methacrylate and (ii) styrene, and acrylic acid;
(b) a surfactant; and
(c) an initiator,
wherein the pressure sensitive adhesive composition has an overall migration of less than 10 mg/dm$^2$, as measured in accordance with EN 1186.

12. The pressure sensitive adhesive composition of claim 11, wherein monomer mixture (a) consists of from 70 to 90 weight percent 2-ethylhexyl acrylate and from 30 to 10 weight percent of the plurality of unsaturated monomers.

13. A pressure sensitive adhesive composition for use in an adhesive layer of a food contact article, comprising:
an acrylic emulsion formed from:
(a) a monomer mixture consisting of, based on the total weight of monomers in the monomer mixture,
from 60 to 90 weight percent 2-ethylhexyl acrylate; and
from 40 to 10 weight percent of unsaturated monomers consisting of (i) methyl methacrylate and (ii) acrylic acid;
(b) a surfactant; and
(c) an initiator,
wherein the pressure sensitive adhesive composition has an overall migration of less than 10 mg/dm$^2$, as measured in accordance with EN 1186.

14. The pressure sensitive adhesive composition of claim 13, wherein monomer mixture (a) consists of from 70 to 90 weight percent 2-ethylhexyl acrylate and from 30 to 10 weight percent of the plurality of unsaturated monomers.

* * * * *